(12) United States Patent
Azzarito et al.

(10) Patent No.: US 7,418,590 B2
(45) Date of Patent: Aug. 26, 2008

(54) INFORMATION HANDLING SYSTEM FOR STORING BASIC INPUT OUTPUT SYSTEM CONFIGURATIONS

(75) Inventors: Douglas A. Azzarito, Round Rock, TX (US); Marc D. Alexander, Cedar Park, TX (US); Todd Martin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 432 days.

(21) Appl. No.: 11/181,613

(22) Filed: Jul. 14, 2005

(65) Prior Publication Data

US 2007/0016765 A1 Jan. 18, 2007

(51) Int. Cl.
*G06F 9/445* (2006.01)
*G06F 15/177* (2006.01)
(52) U.S. Cl. .................. 713/2; 713/1; 713/100
(58) Field of Classification Search ....... 713/2, 713/1, 100
See application file for complete search history.

(56) References Cited

U.S. PATENT DOCUMENTS

| | | | | |
|---|---|---|---|---|
| 5,822,581 A | * | 10/1998 | Christeson | 713/1 |
| 5,964,873 A | * | 10/1999 | Choi | 713/2 |
| 6,615,404 B1 | * | 9/2003 | Garfunkel et al. | 717/173 |
| 6,931,523 B1 | * | 8/2005 | Tomoson et al. | 713/100 |
| 7,117,348 B2 | * | 10/2006 | Holmberg et al. | 713/1 |
| 7,234,054 B2 | * | 6/2007 | Rothman et al. | 713/2 |
| 7,284,085 B2 | * | 10/2007 | Netter et al. | 711/103 |
| 2004/0260718 A1 | * | 12/2004 | Fedorov | 707/102 |
| 2005/0144432 A1 | * | 6/2005 | Wu | 713/2 |

* cited by examiner

*Primary Examiner*—Nitin C. Patel
(74) *Attorney, Agent, or Firm*—Haynes and Boone, LLP

(57) ABSTRACT

An information handling system ("IHS") includes a processor and a memory device for storing instructions processable by the processor for causing the IHS to determine whether configuration of a basic input output system ("BIOS") has been modified. The instructions are also processable by the processor for causing the IHS to, in response to determining that the configuration has been modified, determine whether a previously stored configuration is likely a valid configuration. Moreover, the instructions are processable by the processor for causing the IHS to, in response to determining that the previously stored configuration is likely a valid configuration, store the configuration that has been modified in a new location of a storage device. Furthermore, the instructions are processable by the processor for causing the IHS to, in response to determining that the previously stored configuration is likely not a valid configuration, store the configuration that has been modified in a location of the storage device that stores the previously stored configuration.

18 Claims, 4 Drawing Sheets

INFORMATION HANDLING SYSTEM FOR STORING BASIC INPUT OUTPUT SYSTEM CONFIGURATIONS

BACKGROUND

The description herein relates generally to information handling systems ("IHSs") and more particularly to an IHS that stores basic input output system ("BIOS") configurations.

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS executes one or more instructions (e.g., instructions included in a software program) for performing its operations. For example, an IHS executes a basic input output system ("BIOS") in response to a boot event so that the IHS is capable of controlling its various devices such as an input device (e.g., a keyboard) and a storage device (e.g., a disk drive). A BIOS is configurable, and various configurations (e.g., settings) associated with the BIOS include information associated with devices included in an IHS. For example, a BIOS includes user modifiable configuration (e.g., configuration parameters) associated with devices such as a disk drive, a disk drive controller, and a processor.

A BIOS may cause various problems such as problems associated with the BIOS having an invalid (i.e., non-working) configuration. An invalid BIOS configuration may cause an IHS to become inoperable (e.g., the IHS will not "boot") or otherwise reduce such IHS' operability.

What is needed is a method and an IHS for storing BIOS configurations, without the disadvantages discussed above.

SUMMARY

Accordingly, a method and an information handling system ("IHS") are disclosed. The method includes, determining whether configuration of a basic input output system ("BIOS") has been modified. In response to determining that the configuration has been modified, determining whether a previously stored configuration is likely a valid configuration. In response to determining that the previously stored configuration is likely a valid configuration, storing the configuration that has been modified in a new location of a storage device. In response to determining that the previously stored configuration is likely not a valid configuration, storing the configuration that has been modified in a location of the storage device that stores the previously stored configuration.

DETAILED DESCRIPTION

For purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit ("CPU") or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
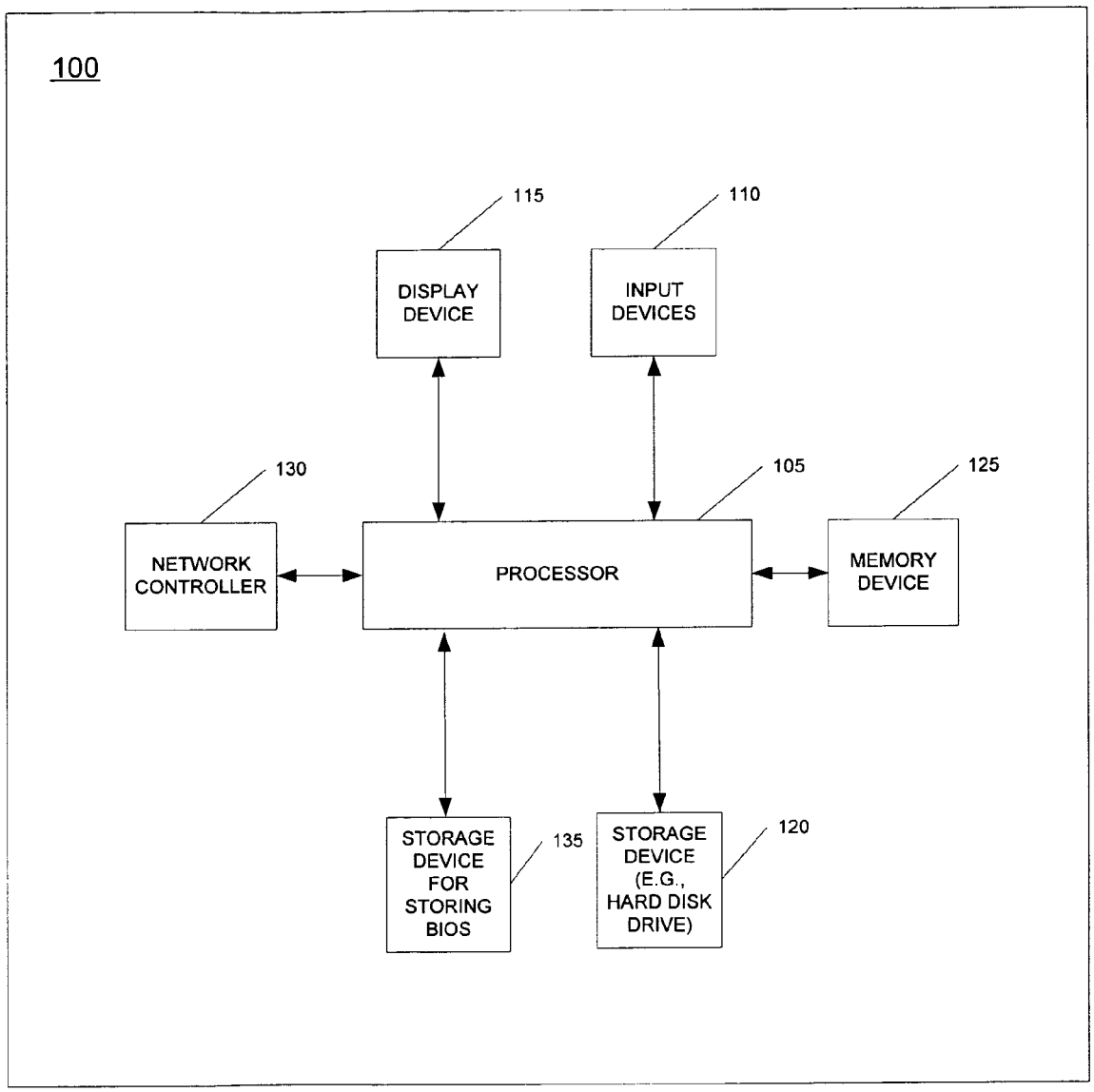
FIG. 1 is a block diagram of an information handling system ("IHS") according to an illustrative embodiment.

FIG. 1 is a block diagram of an IHS, indicated generally at 100, according to the illustrative embodiment. The IHS 100 includes a processor 105 (e.g., an Intel Pentium series processor) for executing and otherwise processing instructions, input devices 110 for receiving information from a human user, a display device 115 (e.g., a cathode ray tube ("CRT") device, a projector, a liquid crystal display ("LCD") device, or a plasma display device) for displaying information to the user, a storage device 120 (e.g., a non-volatile storage device such as a hard disk drive or other computer readable medium or apparatus) for storing information, a memory device 125 (e.g., a random access memory ("RAM") device or a read only memory ("ROM") device), also for storing information, and a network controller 130 for communicating between the IHS 100 and a network. Also, the IHS 100 includes a storage device 135 for storing a basic input/output system ("BIOS"). In one example, the storage device 135 is a non-volatile RAM ("NV-RAM") device.

Each of the input devices 110, the display device 115, the storage device 120, the memory device 125, the memory controller 127 and the network controller 130 is coupled to the processor 105, and to one another. More specifically, the memory device 125 is coupled to the processor 105 via the memory controller 127 as shown. Also, in one example, the IHS 100 includes various other electronic circuitry for performing other operations of the IHS 100, such as a print device (e.g., a ink-jet printer or a laser printer) for printing visual images on paper.

The input devices 110 include, for example, a conventional keyboard and a pointing device (e.g., a "mouse", a roller ball, or a light pen). A user operates the keyboard to input alphanumeric text information to the processor 105, and the processor receives such information from the keyboard. A user also operates the pointing device to input cursor-control information to the processor 105, and the processor 105 receives such cursor-control information from the pointing device.

The IHS 100 executes the BIOS that is stored in the storage device 135. As discussed above, a conventional IHS is capable becoming inoperable because of an invalid BIOS configuration. For example, such conventional IHS includes a "factory default" BIOS configuration which is set when the conventional IHS' BIOS is formed. However, such "factory default" configuration is capable of subsequently being modified (e.g., at a manufacturer's facility) so that the BIOS configuration (e.g., "factory modified" configuration) is valid for specific devices included in the IHS. Accordingly, the "factory default" BIOS configuration may be invalid and thereby cause the IHS to become inoperable or otherwise reduce the IHS' operability.

In response to a problem with such conventional IHS, the IHS' user may restore the "factory default" BIOS configuration, for example, as directed by a technical support personnel. However, as discussed above, selecting the "factory default" configuration may cause the IHS to become inoperable. Although, the user is capable of modifying (e.g., manually modifying) the BIOS configuration in an attempt to restore a configuration (e.g., the "factory modified" configuration) that is appropriate for the IHS, such modification may be complicated and/or time consuming.

Figure 2:
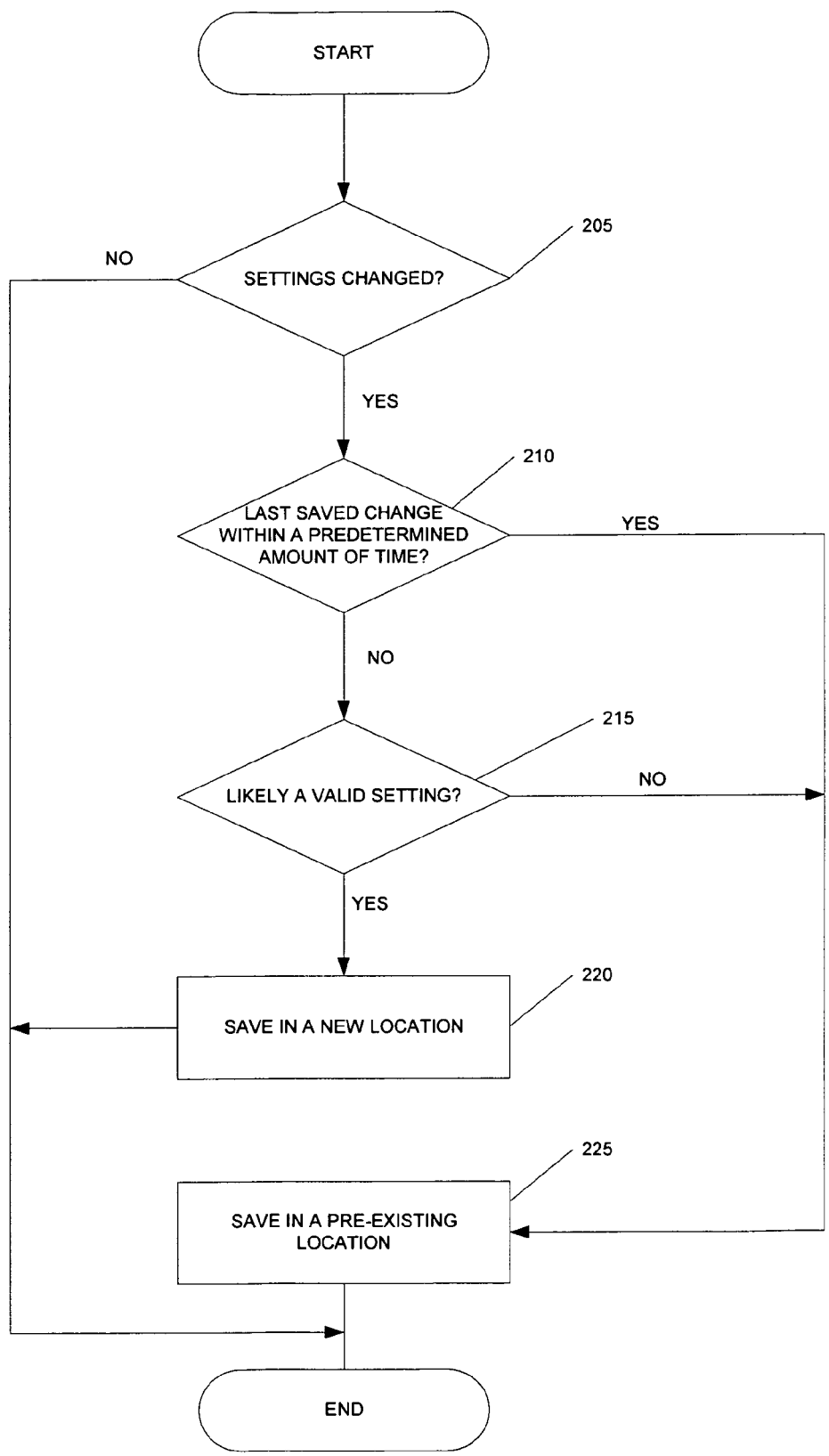
FIG. 2. is a flow chart of operations performed by the IHS of FIG. 1 for storing basic input output system ("BIOS") configurations.

Accordingly, in the illustrative embodiment, the IHS 100 performs the operations discussed below (in connection with FIGS. 2, 3, and 4) so that the IHS 100 stores and restores prior BIOS configurations (e.g., "working configurations") that are likely to be valid for the IHS 100. FIG. 2 is a flow chart of operations performed by the IHS 100 for storing BIOS configurations.

The operations begin at a step 205, where the IHS 100 self loops until it has determined that its BIOS configuration has been modified. As discussed above, the BIOS configuration is user modifiable. In response to a boot event (e.g., the user powering the IHS 100 on), the IHS 100 boots. While it is booting, the IHS 100 is capable of receiving a command (e.g., an input command issued via a keyboard stroke combination) from the user. In response to such command, the IHS 100 outputs to the display device 115, a screen (e.g., a "setup" screen), from which the user is capable of modifying the BIOS configuration. After the user has modified the BIOS configuration, the user is capable of effectuating the modification by "saving" the modified configuration. In response to determining that the user has selected to save the modified configuration, the IHS 100 determines that the BIOS has been modified.

Referring again to the step 205, in response to determining that the BIOS configuration has been modified, the operations continue to a step 210. At the step 210, the IHS 100 determines whether it has already stored (i.e., saved) a BIOS configuration (e.g., a "snapshot" of a configuration) within a previously determined time period. The IHS 100 makes such determination so that it reduces the potential number of configurations saved. As shown, if the IHS 100 determines that it has already saved a BIOS configuration within the previously determined time period, the operations continue to a step 225. In one embodiment, the IHS 100 determines whether it has already saved a BIOS configuration for the day. In other embodiments, the predetermined period of time is a week or any other suitable period of time.

Referring again to the step 210, if the IHS 100 determines that it has not saved a BIOS configuration within the predetermined period of time, the operations continue to a step 215. At the step 215, the IHS 100 determines whether the most recently saved configuration is likely a valid (e.g., a "working") configuration. If the IHS 100 determines that the most recently saved configuration is likely a valid configuration, the operations continue to the step 220. Otherwise, the operations continue to the step 225.

In one example, the IHS 100 determines whether the most recently saved configuration is likely a valid configuration in response to the number of instances the most recently saved configuration was executed for booting the IHS 100. More specifically, the IHS 100 determines that greater the number of instances in which a BIOS configuration is executed for booting the IHS 100, greater the likelihood that the BIOS configuration is a valid configuration. Accordingly, in one embodiment, the IHS determines whether the number of instances in which the most recently saved BIOS configuration is used for booting is greater than a previously determined number. In response to determining that such number is greater than the previously determined number, the IHS 100 determines that the most recently saved BIOS configuration is likely a valid configuration.

At the step 220, the IHS 100 stores the newly modified configuration in a new location (e.g., a memory location) in the storage device 135 so that the IHS 100 does not delete (e.g., by overwriting) a pre-existing configuration (e.g., the most recently saved configuration) that was determined to be likely a valid configuration at the step 215. More particularly, the IHS 100 creates a new "slot" (e.g., a new "save slot") in the storage device, and stores the configuration in the newly created slot. After the step 220, the operations end.

Conversely, at the step 225, the IHS 100 stores the newly modified configuration in a pre-existing location of the storage device 135. For example, the IHS 100 stores the modified configuration in a pre-existing location that includes the most recently saved configuration that was determined not to be likely a valid configuration. Accordingly, the IHS 100 overwrites the pre-existing configuration, and reduces the potential number of configurations that will be stored in the storage device 135. After the step 225, the operations end.

As discussed above, the IHS 100 is capable of restoring the various configurations that are stored in the storage device 135. Accordingly, FIG. 3 is a flow chart of operations performed by the IHS 100 for restoring a BIOS configuration selected from a plurality of BIOS configurations that are stored.

Figure 3:
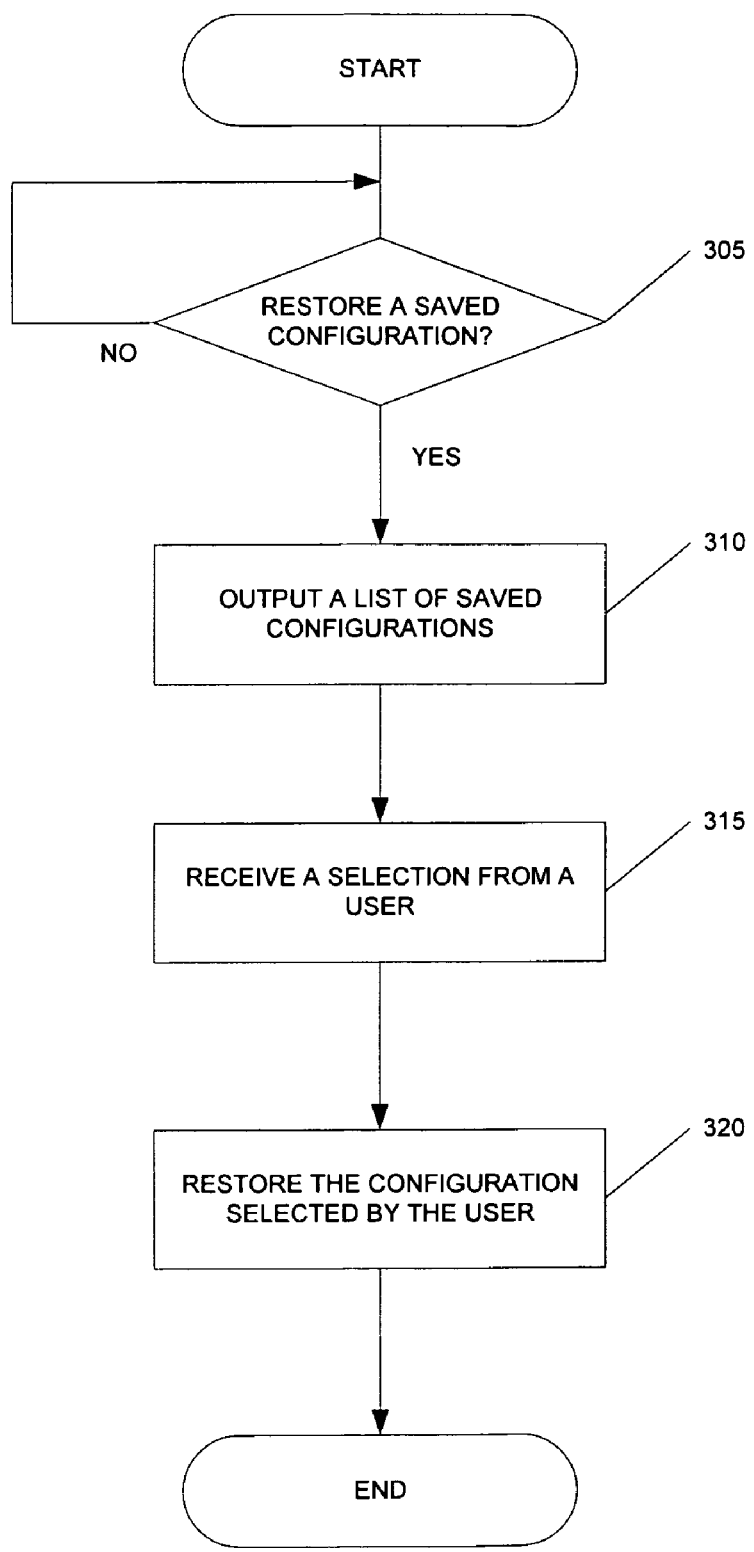
FIG. 3 is a flow chart of operations performed by the IHS of FIG. 1 for restoring BIOS configurations.
Figure 4:
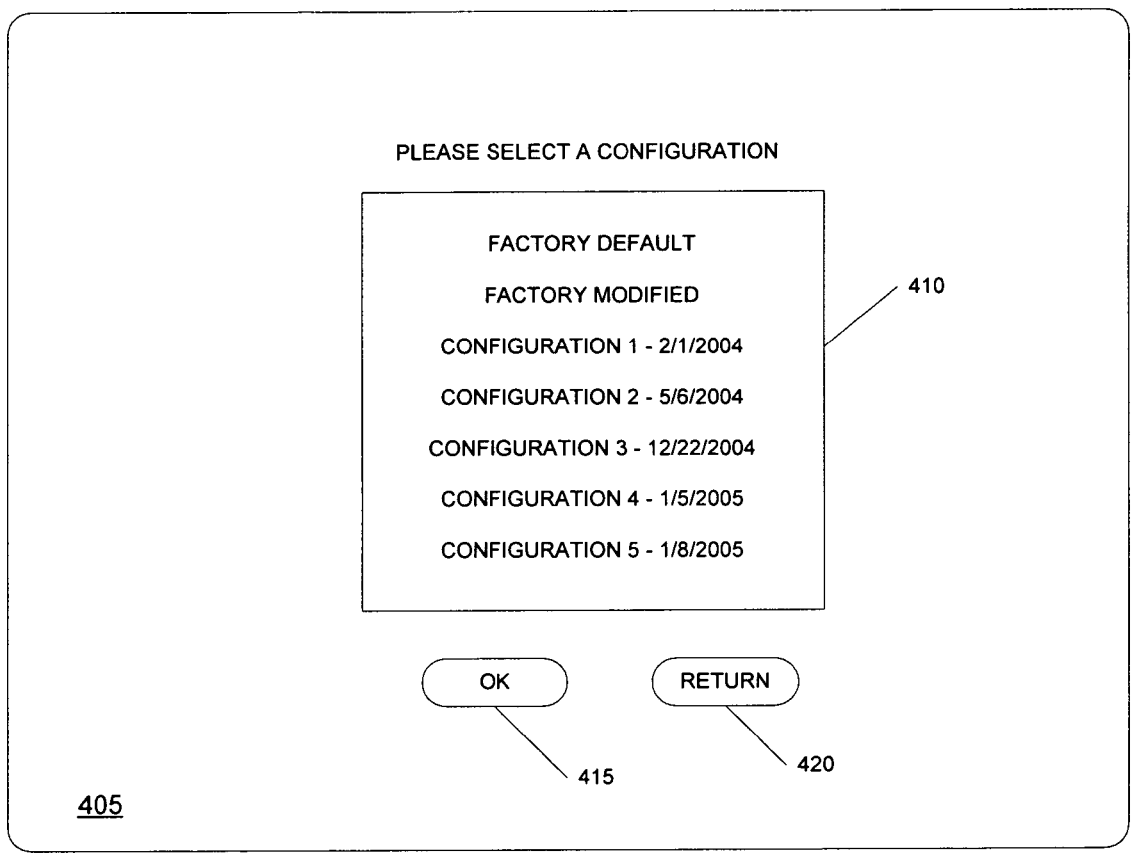
FIG. 4 is an illustration of a screen displayed by a display device of the IHS of FIG. 1.

Also, FIG. 4 is an illustration of a screen 405, displayed by the display device 115, associated with the operations illustrated in FIG. 3. The screen 405 includes a user selectable list 410 for displaying a list of configurations available for restoration. The screen 405 also includes buttons 415 and 420. The button 415 is an "OK" button and the button 420 is a "return" button.

The following discussions of the operations illustrated by FIG. 3, also references FIG. 4. The operations of FIG. 3 begin at a step 305, where the IHS 100 self loops until it has determined that it is specified to restore a saved configuration. In one example, the IHS 100 determines as such in response to a user command (e.g., a user command input via a keyboard). In response to determining that it is specified to restore a saved configuration, the operations continue to a step 310.

At the step 310, the IHS 100 outputs, to the display device 115, a list of saved configurations that are available to be restored. In the illustrative embodiment, such list of saved configurations is represented by the user selectable list 410.

Accordingly, the IHS 100 outputs the list by outputting the screen 405 of FIG. 4. After the step 310, the operations continue to a step 315.

At the step 315, the IHS 100 receives a selection from the user indicating the configuration to be restored. In one example, the user inputs such selection to the IHS 100 by selecting (e.g., by "high-lighting") a configuration included in the selectable list 410. After high-lighting the desired configuration (e.g., by using a keyboard), the user selects the OK button 415 to confirm the selection of the desired configuration. By comparison, user is capable of selecting the return button 420 to disaffirm the selection of the desired configuration. For example, in response to the user selecting the return button 420, the IHS 100 outputs a different screen (e.g., a screen displayed prior to the screen 405)). After the step 315, the operations continue to a step 320.

At the step 320, the IHS 100 restores the configuration selected (and affirmed) by the user. After the step 320, the operations end.

Example types of configurations included in a user selectable list of configurations (e.g., the list of configurations 410) include a "factory default" configuration. A factory default configuration is created when an IHS' BIOS is created. Such example types also include a "factory modified" configuration, which is formed by modifying a factory default configuration before such IHS is transported from a factory (e.g., to a user). Moreover, example types of configuration include a "user modified" configuration. For each user modified configuration displayed in a screen (e.g., the screen 405), the IHS 100 includes information such as date and time that the configuration was modified so that each user modified configuration is identifiable by the date and the time.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method comprising:
   determining whether configuration of a basic input output system ("BIOS") has been modified;
   in response to determining that the configuration has been modified, determining whether a previously stored configuration is likely a valid configuration, wherein determining whether a previously stored configuration is likely a valid configuration includes determining whether a number of instances in which the previously stored configuration was executed for booting an information handling system ("IHS") is greater than a previously determined number;
   in response to determining that the previously stored configuration is likely a valid configuration, storing the configuration that has been modified in a new location of a storage device; and
   in response to determining that the previously stored configuration is likely not a valid configuration, storing the configuration that has been modified in a location of the storage device that stores the previously stored configuration.

2. The method of claim 1, wherein the previously stored configuration is a most recently stored configuration.

3. The method of claim 2, and comprising:
   determining whether the most recently stored configuration was stored within a previously determined period of time.

4. The method of claim 3, wherein the previously determined period of time is a day.

5. The method of claim 1, wherein each of a plurality of configurations stored is restorable in response to a user command.

6. The method of claim 5, wherein at least one of the plurality of configurations stored is identifiable by time.

7. The method of claim 5, wherein at least one of the plurality of configurations stored is identifiable by date.

8. The method of claim 1, wherein storing the configuration that has been modified includes storing the configuration on a storage device.

9. The method of claim 8, wherein the storage device is a non-volatile random access memory ("NVRAM").

10. An information handling system ("IHS") comprising:
    a processor; and
    a memory device for storing instructions processable by the processor for causing the IHS to:
    determine whether configuration of a basic input output system ("BIOS") has been modified;
    in response to determining that the configuration has been modified, determine whether a previously stored configuration is likely a valid configuration, wherein determining whether a previously stored configuration is likely a valid configuration includes determining whether a number of instances in which the previously stored configuration was executed for booting the IHS is greater than a previously determined number;
    in response to determining that the previously stored configuration is likely a valid configuration, store the configuration that has been modified in a new location of a storage device; and
    in response to determining that the previously stored configuration is likely not a valid configuration, store the configuration that has been modified in a location of the storage device that stores the previously stored configuration.

11. The IHS of claim 10, wherein the previously stored configuration is a most recently stored configuration.

12. The IHS of claim 11, wherein the memory device is for storing instructions processable by the processor for casing the IHS to determine whether the most recently stored configuration was stored within a previously determined period of time.

13. The IHS of claim 12, wherein the previously determined period of time is a day.

14. The IHS of claim 10, wherein each of a plurality of configurations stored is restorable in response to a user command.

15. The IHS of claim 14, wherein at least one of the plurality of configurations stored is identifiable by time.

16. The IHS of claim 14, wherein at least one of the plurality of configurations stored is identifiable by date.

17. The IHS of claim 10, wherein storing the configuration that has been modified includes storing the configuration on a storage device.

18. The IHS of claim 17, wherein the storage device is a non-volatile random access memory ("NVRAM").

\* \* \* \* \*